United States Patent
Sengokudani et al.

(10) Patent No.: US 9,973,138 B2
(45) Date of Patent: May 15, 2018

(54) BRUSHLESS MOTOR AND WASHING MACHINE PROVIDED WITH SAME

(71) Applicant: Panasonic Intellectual Property Management Co., Ltd., Osaka (JP)

(72) Inventors: Yoshikazu Sengokudani, Osaka (JP); Mitsuhiro Sakamoto, Osaka (JP); Hideharu Hiwaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/328,334

(22) PCT Filed: Sep. 2, 2015

(86) PCT No.: PCT/JP2015/004450
§ 371 (c)(1),
(2) Date: Jan. 23, 2017

(87) PCT Pub. No.: WO2016/038850
PCT Pub. Date: Mar. 17, 2016

(65) Prior Publication Data
US 2017/0214358 A1 Jul. 27, 2017

(30) Foreign Application Priority Data
Sep. 11, 2014 (JP) .................. 2014-184953

(51) Int. Cl.
*H02H 7/09* (2006.01)
*H02P 29/68* (2016.01)
(Continued)

(52) U.S. Cl.
CPC .............. *H02P 29/68* (2016.02); *D06F 33/02* (2013.01); *D06F 37/40* (2013.01); *H02P 6/20* (2013.01)

(58) Field of Classification Search
CPC .......... H02P 29/68; H02P 21/22; H02P 27/06; D06F 37/40; H02H 9/025; H02M 7/219; H03K 17/063; H02K 11/33
(Continued)

(56) References Cited

U.S. PATENT DOCUMENTS 5,898,557 A * 4/1999 Baba .................. H03K 17/0822
361/100
6,052,268 A * 4/2000 Thomas ............... H03K 17/082
361/103

(Continued)

FOREIGN PATENT DOCUMENTS

JP 6-197589 7/1994
JP 10-201280 7/1998

(Continued)

OTHER PUBLICATIONS

International Search Report of PCT application No. PCT/JP2015/004450 dated Nov. 24, 2015.

*Primary Examiner* — Bentsu Ro
*Assistant Examiner* — Thai Dinh
(74) *Attorney, Agent, or Firm* — McDermott Will & Emery LLP

(57) ABSTRACT

A brushless motor includes: a motor including a stator around which a winding wire is wound and a rotor holding a permanent magnet; a motor control microcomputer; an inverter circuit in which a power element is incorporated and controls an amount of a voltage applied to the winding wire; a temperature detecting element which detects a temperature of the power element; and a current detecting element which detects a power supply current or a current of the winding wire. A first current limit value is defined by current limit value which is set such that a junction temperature of the power element does not exceed a predetermined value, the brushless motor sets a second current limit value which is (Continued)

US 9,973,138 B2

Page 2 higher than the first current limit value, and the brushless motor operates, based on the second current limit value only in a predetermined period after start-up of the brushless motor.

8 Claims, 15 Drawing Sheets

(51) Int. Cl.
    *D06F 33/02*     (2006.01)
    *D06F 37/40*     (2006.01)
    *H02P 6/20*     (2016.01)

(58) Field of Classification Search
    USPC .......................... 318/400.22, 430, 434, 471
    See application file for complete search history.

(56) References Cited

U.S. PATENT DOCUMENTS

| | | | |
|---|---|---|---|
| 6,992,452 B1 * | 1/2006 | Sachs | H02P 29/032 318/434 |
| 8,148,929 B2 * | 4/2012 | Wei | H02M 1/32 318/400.2 |
| 8,243,407 B2 * | 8/2012 | Fukami | H03K 17/0822 361/78 |
| 8,421,391 B2 * | 4/2013 | Yeh | G01K 7/42 318/400.15 |
| 9,673,747 B2 * | 6/2017 | Nakamura | H02P 27/085 |
| 2004/0124808 A1 | 7/2004 | Hirono | |
| 2005/0204761 A1 * | 9/2005 | Karikomi | G01K 7/425 62/228.1 |
| 2015/0084570 A1 * | 3/2015 | Hara | B62D 5/0403 318/494 |
| 2015/0377717 A1 * | 12/2015 | Rollin | G01K 7/01 318/400.26 |

FOREIGN PATENT DOCUMENTS

| | | |
|---|---|---|
| JP | 2000-166289 | 6/2000 |
| JP | 2004-208450 | 7/2004 |
| JP | 2006-340743 | 12/2006 |

* cited by examiner

BRUSHLESS MOTOR AND WASHING MACHINE PROVIDED WITH SAME

CROSS-REFERENCE TO RELATED APPLICATIONS

This application is a U.S. national stage application of the PCT International Application No. PCT/JP2015/004450 filed on Sep. 2, 2015, which claims the benefit of foreign priority of Japanese patent application No. 2014-184953 filed on Sep. 11, 2014, the contents all of which are incorporated herein by reference.

TECHNICAL FIELD

The present invention relates to a brushless motor in which an operation control function of a washing tub is incorporated, and relates to a washing machine provided with the brushless motor.

BACKGROUND ART

First, with reference to FIG. 9, a description will be given to an example of a conventional brushless motor mounted on a general full automatic washing machine or a drum washing machine (hereinafter, simply referred to as a washing machine). FIG. 9 is a block diagram of conventional washing machine 600 provided with brushless motor 610 to which a rotation speed (hereinafter, simply referred to as a speed) instruction is input and a speed of which can be controlled according to the speed instruction.

Brushless motor 610 is configured with analogue IC type motor control circuit 620 having no arithmetic processing function, inverter circuit 20, temperature sensor 21 which detects a temperature of a power element incorporated in inverter circuit 20, current detecting element 22 which detects a power supply current Iz, motor 50, and position sensor 57 which detects a rotor position. Motor control circuit 620 has speed controller 621 which generates a PWM (pulse-width modulation) duty signal based on a speed instruction signal Sz informed from body-side micro controller (hereinafter, referred to as a microcomputer) 670, a signal of a reference triangular wave (not shown), and the like.

Washing machine body 601 is configured with body-side microcomputer 670, power supply unit 80, brushless motor 610, washing tub 90, various sensors 130, operation unit 112, and display unit 113. Body-side microcomputer 670 is configured with body control function unit 71 and motor speed instruction unit 72. Body control function unit 71 performs control and causes washing tub 90 to arbitrarily operate, by using signals of various sensors 130 and a speed signal having been subjected to signal processing on brushless motor 610. Motor speed instruction unit 72 generates a speed instruction to appropriately operate brushless motor 610 and outputs the speed instruction to brushless motor 610 as the speed instruction signal Sz such that washing tub 90 performs an arbitrary operation.

Here, a logic of an operation of the motor will be described. FIG. 10 is a diagram showing an operation example of brushless motor 610 in one cycle of washing, and FIG. 11 is an enlarged view of a part, of FIG. 10, at the time of start-up. With reference to FIG. 10 and FIG. 11, the horizontal axes represent time t, and the waveforms represent, from top to bottom, signal waveform Sz(t) of the speed instruction signal Sz, actual voltage waveform Vz(t) of the signal waveform Sz(t), current waveform Iz(t) of the power supply current Iz, rotation speed RTz(t), and temperature change Tz(t) of a power element temperature Tz.

According to an operation mode selected by operation unit 112, in order to repeat operation/stop of the washing tub, the speed instruction signal Sz is output, from body-side microcomputer 670 to motor control circuit 620, as the signal waveform Sz(t) in a pulse shape having rise and fall as shown in FIG. 10 and FIG. 11. Here, the voltage of the speed instruction signal Sz corresponds to the instructed speed. Note that there are various impedance components from body-side microcomputer 670 to motor control circuit 620. With this configuration, the actual speed instruction signal Sz is input to motor control circuit 620, having an analogue signal waveform which has a time constant (around 200 milliseconds, for example) at the time of rising and falling as represented by voltage waveform Vz(t).

Motor control circuit 620 converts such a speed instruction signal Sz into a PWM duty signal of about 10 kHz to 20 kHz to drive inverter circuit 20. By this operation, inverter circuit 20 applies a voltage depending on the PWM duty signal to a winding wire of motor 50, so that brushless motor 610 operates.

As a result, a trajectory in which peak values of the current flowing through a power supply line are recorded shows a waveform represented by the current waveform Iz(t) of the power supply current Iz. In a period ranging from about a few milliseconds to a few hundred milliseconds after start-up, the rotation speed RTz(t) of the motor is relatively small, and a counter-electromotive force generated in the winding wire is accordingly small. Thus, almost all the applied voltage is applied to the winding wire, and the current peaks reach a current limit value Ip1 as shown in FIG. 11 (this state is referred to as an over-load state).

Here, an operation of limiting current will be described. The power supply current Iz is detected as a voltage signal by current detecting element 22 and is compared with a reference voltage corresponding to the current limit value. Then, if the voltage signal is equal to or greater than the reference voltage value, an operation of limiting current is performed. For example, in a method for limiting current, overcurrent is limited by repeating an operation in which switching according to the PWM duty signal of the power element in inverter circuit 20 is once turned off and the switching is restarted at the timing of the next duty instruction.

In this operation, the rotation speed of the motor rises toward a predetermined rotation speed shown in the rotation speed RTz(t). After the start-up, the rotation speed is gradually getting close to the predetermined rotation speed, and the peaks of the power supply current Iz are also gradually getting close to the current limit value Iq. Note that the above-mentioned current limit value Ip1 is a current limit value Ip1 in an over-load state (at the time of start-up), and the current limit value Iq is here a current limit value Iq for a steady load state.

Here, the current limit value Ip1 is set as described below. First, a protection operation temperature is defined by a package temperature at which a junction temperature of the power element does not exceed the maximum allowable junction temperature Tjmax, which is the allowable maximum value on the premise that the brushless motor generally performs a continuous operation. Here, as the current limit value Ip1, the maximum value of a current allowable value at the protection operation temperature is set. Further, the current limit value Iq is the maximum value of a current enough to generate torque necessary for the motor to rotate at a predetermined rotation speed. Note that, in the following description, the current limit value Ip1 is appropriately referred to as a first current limit value Ip1.

The power element temperature Tz, which is the temperature of the power element (package temperature) incorporated in inverter circuit 20, rises during an operation (washing operation) instruction and falls during a stop instruction as shown by the temperature change Tz(t). Typically, the temperature of the power element keeps rising as a whole in one cycle of washing while repeating rise and fall.

FIG. 12 is a diagram showing an example of a rising curve of the power element temperature Tz at the time of load operation of a real machine. The temperature rise of a real machine is generally checked after repetition of three cycles of washing, rinsing, and dewatering. Usually, of the components constituting a washing machine, the temperature rise is largest in the power element of the motor. For this reason, the body control is designed such that the temperature of the power element will not exceed the protection operation temperature after repetition of three cycles.

However, there is a possibility that an unexpected overload operation or an abnormal usage which may lead to a motor lock can be performed during an actual usage of a washing machine, and in such a case, the temperature of the power element abnormally rises. To address this issue, a technique is conventionally proposed in which some measures are taken to prevent the junction temperature from exceeding the maximum allowable junction temperature Tjmax and the power element from getting broken. In an example of the measures, the protection operation temperature is previously set on the motor side, and if the temperature of the power element reaches the temperature, a protection operation is performed to prevent the power element from getting broken (for example, see PTLs 1 to 3).

FIG. 13 is a diagram showing a more specific operation example of the above protection operation. In the operation example shown in FIG. 13, if the power element temperature Tz exceeds the protection operation temperature Tp, the voltage of the speed instruction signal Sz is set to an OFF level to stop the drive of inverter circuit 20. By the above operation, the application of a voltage to the motor is terminated, and the flow of current is thus stopped, so that the motor stops turning, and the washing tub stops. Then, when the temperature becomes lower than a protection release temperature, the operation is restarted.

FIG. 14 is a diagram showing still another specific operation example of the above protection operation. The operation example shown in FIG. 14 shows a method in which the current limit value is lowered, and the adjusted current limit value Ip1' is set so as to satisfy the relationship Ip1>Ip1'>Iq. In the above method, the power element temperature Tz and the current limit value are determined unambiguously by an analogue circuit, and the current limit value increases and decreases passively according to the power element temperature Tz. Further, because the current limit value Ip1' satisfies the relationship Ip1'<Ip1, the current at the time of start-up becomes lower, and the torque generated by the motor is accordingly becomes lower, so that it takes a longer time to reach a predetermined rotation speed.

FIG. 15 is a diagram showing a still another operation example of the above protection operation. The operation example shown in FIG. 15 shows a case that the current limit value Ip1' is set to satisfy the relationship Ip1'<Iq. In this case, because the current limit value Ip1' is lower than the current limit value Iq which can generate enough torque to rotate at the predetermined rotation speed, the rotation speed cannot reach the predetermined rotation speed.

As described above, the conventional brushless motor in a washing machine has a protection function in which the rise in the temperature of the power element causes the motor to stop or in which the current limit value is lowered and the generated torque gets accordingly lower. Thus, there is a possibility that if the temperature of the power element becomes too high, the washing tub stops or the rotation speed does not reach the predetermined rotation speed.

Therefore, in order to prevent a change in motor output from affecting a washing time or a cleaning performance of laundry, consideration needs to be taken to the control of the washing machine body such that an overheat protection operation is not performed in repetition of operation and stop of the motor.

That is, in the case of an adjustment of time such as shortening an operation time or lengthening a stopping time or in the case of setting a predetermined rotation speed, settings need to be made with such a margin that the rise in the temperature of the power element never reaches the protection operation temperature even under the worst condition. In addition, in designing of controlling the washing machine body, design of the motor control is required to be made in order to prevent overheat of the power element.

As described above, the conventional analogue IC incorporated type brushless motor shown in FIG. 9 cannot determine the relationship between the power element temperature and the current limit value. That is, comparison is only performed between the temperature information of the power element and the reference voltage in order to change the current limit value.

The conventional analogue IC type brushless motor cannot read as information a speed of change in the power element temperature or a margin to the reference voltage to estimate an amount of change or a margin of the temperature in the future. Therefore, the protection operation temperature is generally determined, on the premise that the brushless motor performs a continuous operation, such that the junction temperature of the power element does not exceed Tjmax, and the maximum current value allowable at the temperature is set as the current limit value Ip1.

For this reason, the current limit value cannot be set equal to or greater than the current limit value Ip1. Therefore, the control has such a passive function that only the current limit value is lowered when the temperature of the power element reaches the protection operation temperature.

CITATION LIST

Patent Literature

PTL 1: Unexamined Japanese Patent Publication No. H10-201280

PTL 2: Unexamined Japanese Patent Publication No. 2004-208450

PTL 3: Unexamined Japanese Patent Publication No. 2000-166289

SUMMARY OF THE INVENTION

A brushless motor according to the present invention is a brushless motor for a washing machine and the brushless motor includes: a motor including a stator around which a winding wire is wound and a rotor holding a permanent magnet; a motor control microcomputer; an inverter circuit in which a power element is incorporated and controls an amount of a voltage applied to the winding wire; a temperature detecting element which detects a temperature of the power element; and a current detecting element which detects a power supply current or a current of the winding wire. A first current limit value is defined by a current limit value which is set such that a junction temperature of the power element does not exceed a predetermined value on a premise that the brushless motor performs a continuous operation, the brushless motor sets a second current limit value higher than the first current limit value, and the brushless motor operates, based on the second current limit value only in a predetermined period after start-up of the brushless motor.

Further, a washing machine according to the present invention has a configuration in which the brushless motor is mounted.

With this configuration, it is possible to arbitrarily set the second current limit value greater than the conventional first current limit value in order to increase torque at the time of start-up and to start up with the maximum torque while the temperature of the power element is being controlled.

Thus, with the present invention, it is possible to enhance cleaning performance, and at the same time, to control the rise in the temperature of the power element to prevent the power element from getting broken, and it is also possible to reduce the washing time.

DESCRIPTION OF EMBODIMENT

An exemplary embodiment of the present invention will be described with reference to the drawings. Note that the exemplary embodiment does not limit the present invention.

Exemplary Embodiment

Figure 1:
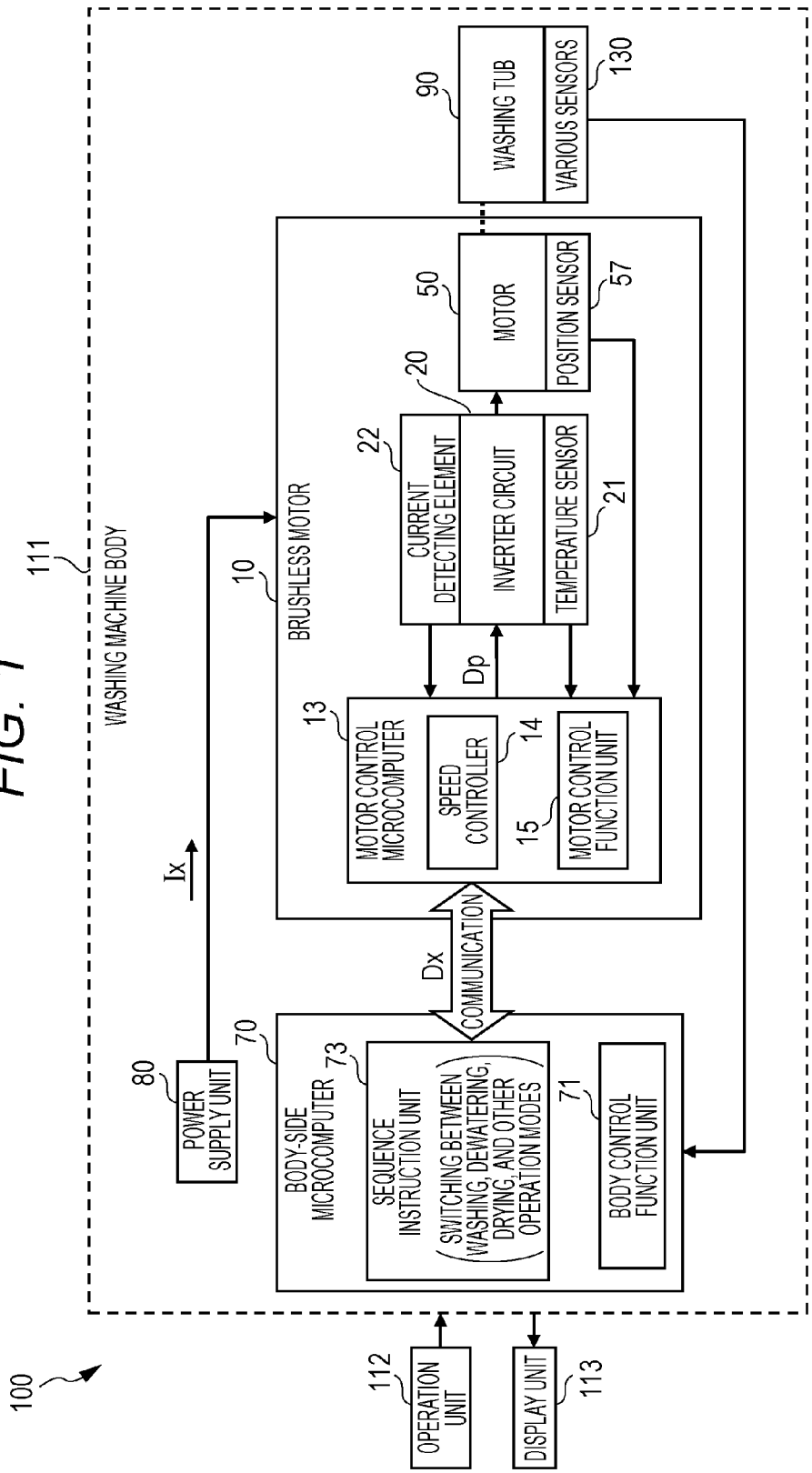
FIG. 1 is a block diagram of a washing machine including a brushless motor according to an exemplary embodiment of the present invention.
Figure 2:
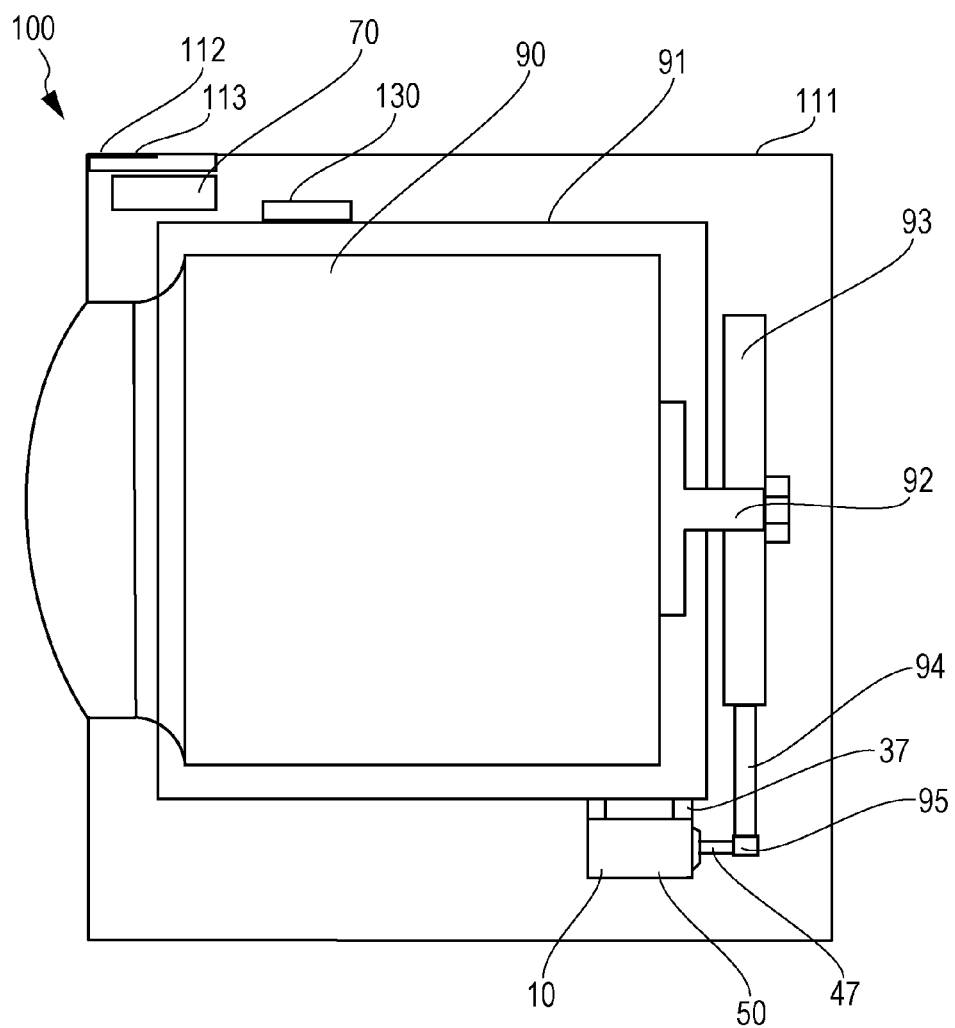
FIG. 2 is a diagram showing a configuration example of the washing machine.
Figure 3:
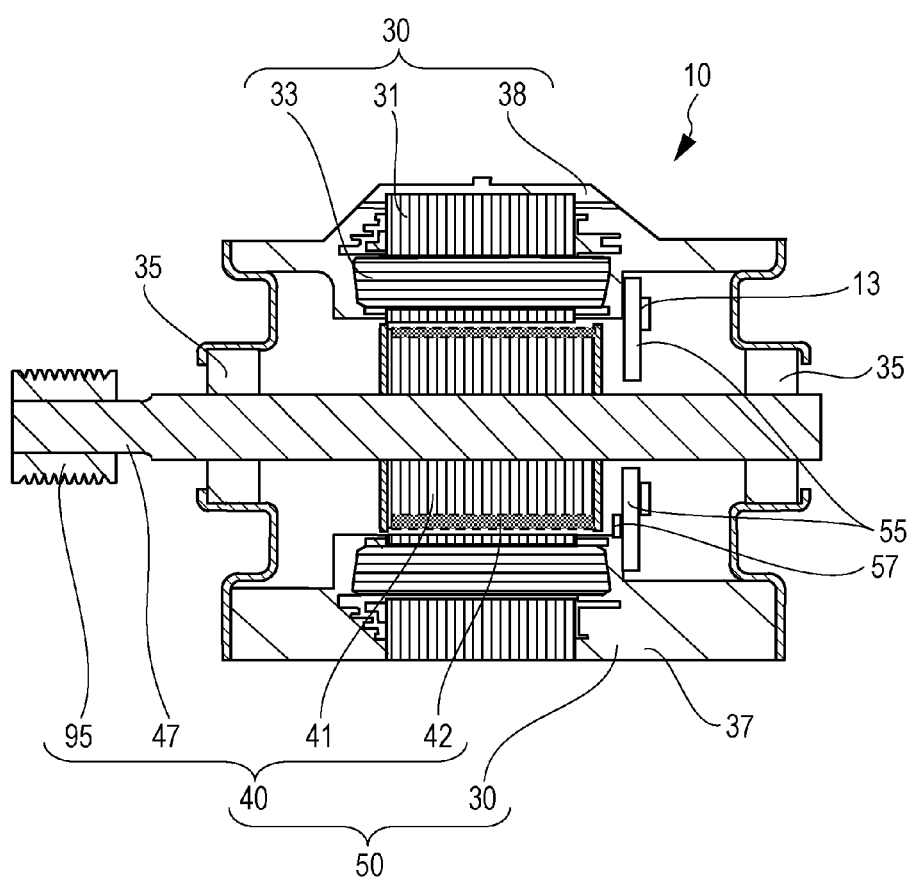
FIG. 3 is a diagram showing a configuration example of the brushless motor according to the exemplary embodiment of the present invention.

FIG. 1 is a block diagram of washing machine 100 including brushless motor 10 according to an exemplary embodiment of the present invention. Further, FIG. 2 is a diagram showing a configuration example of washing machine 100. Further, FIG. 3 is a diagram showing a configuration example of brushless motor 10.

First, with reference to FIG. 2, the configuration of washing machine 100 will be described. As shown in FIG. 2, washing machine 100 includes tank 91 which is elastically supported in a washing machine body and houses and rotatably supports washing tub 90, which is a rotary drum having a rotation axis in a horizontal direction or an oblique direction. On a back side of tank 91, pulley 93 is disposed to transmit driving force to washing tub 90 through shaft 92, and under tank 91, brushless motor (hereinafter, appropriately referred to simply as a motor) 10 is fixed through mounting part 37 to transmit driving force to pulley 93. Further, motor pulley 95 attached on an end of rotation shaft 47 of motor 10 and pulley 93 are connected by belt 94 to transmit rotation. In the above configuration, rotation of rotation shaft 47 of motor 10 rotates washing tub 90, and laundry in washing tub 90 is thus washed. Further, on an upper part of washing machine body 111, there are disposed operation unit 112 and display unit 113, respectively, to input an instruction by an operation of a user from a user and to display a state of washing to the user. Further, for example, in order to perform a washing operation depending on the instruction from operation unit 112 or in order to control motor 10 for that operation, washing machine 100 has body-side microcomputer 70 inside washing machine 100. Further, in order to enable communication of information, body-side microcomputer 70 and the above-described operation unit 112, display unit 113, various sensors 130, and motor 10, are connected through, for example, a communication line such as a serial data communication based on a predetermined communication format.

Next, with reference to FIG. 3, a configuration of brushless motor 10 will be described. Motor 10 includes stator 30 fixed to tank 91 of washing machine 100 and rotor 40 rotatably held to face stator 30.

Stator 30 includes stator core 31, winding wire 33, stator frame 38, and mounting part 37. Stator core 31 is configured with, for example, laminated thin iron plates. Winding wire 33 is wound around stator core 31 through a winding wire isolation member. Mounting part 37 is provided to fix motor 10 to tank 91. Further, stator frame 38 holds stator core 31 and bearing 35 and is fixed to tank 91 through mounting part 37.

Further, rotor 40 includes rotor core 41, magnets 42, and motor pulley 95 centering on rotation shaft 47 rotatably held by bearing 35. Rotor core 41 is fixed to rotation shaft 47 at an approximately central part of rotation shaft 47 and is configured with, for example, laminated thin iron plates. Magnets 42 are permanent magnets and are arranged on an outer circumference of rotor core 41. Further, on one end side of rotation shaft 47, there is fixed motor pulley 95 to transmit driving force generated by rotor 40 to washing tub 90.

Stator 30 and rotor 40 are configured as described above to constitute motor 50. When motor 50 is energized and driven by applying a drive voltage to winding wire 33 of stator 30 so as to flow a winding wire current, rotor 40 rotates.

Further, in the present exemplary embodiment, there is disclosed an example of a brushless motor in which a drive circuit is incorporated in motor 50 to energize and drive winding wire 33. Specifically, as shown in FIG. 3, motor 10 further houses circuit board 55 on which circuit components are mounted to constitute a drive circuit. In the present exemplary embodiment, in addition to position sensor 57 and a power element for inverter circuit 20 to supply a drive voltage to winding wire 33, there is also mounted, for example, motor control microcomputer 13 on circuit board 55.

As described above, motor 10 has a configuration including motor control microcomputer 13 which is for controlling the motor and has an arithmetic processing function, inverter circuit 20, motor 50, and position sensor 57. In the present exemplary embodiment, as shown in FIG. 1, motor 10 further includes temperature sensor 21 functioning as a temperature detecting element which is incorporated in inverter circuit 20 to detect the temperature of the power element and current detecting element 22 to detect a power supply current Ix from power supply 80 or a current of the winding wire.

Motor control microcomputer (hereinafter, appropriately referred to as a motor-side microcomputer) 13 is provided to control motor 10 and can perform data communication with body-side microcomputer 70. Motor-side microcomputer 13 includes motor control function unit 15 and speed controller 14. By using a signal from position sensor 57, a signal from current detecting element 22, and a signal from temperature sensor 21, motor control function unit 15 controls motor 50 so that washing tub 90 can be arbitrarily operated. Speed controller 14 calculates, based on the speed instruction from body-side microcomputer 70 and the signal from position sensor 57, a drive amount so that the detected or estimated actual speed will become equal to the instructed speed. Then, a PWM duty signal Dp is generated which is constituted by pulses having a duty width corresponding to the drive amount by using a reference triangular wave (not shown) and a signal depending on the drive amount. The generated PWM duty signal Dp is supplied to inverter circuit 20 which controls the amount of a voltage applied to winding wire 33. Inverter circuit 20 has power elements switched by a pulse signal, and the switching power elements incorporated in inverter circuit 20 are each turned on and off according to the level of the pulse of the PWM duty signal Dp. The above operation of inverter circuit 20 generates the drive voltage depending on the drive amount, and the drive voltage is supplied to winding wire 33 of motor 50. Because inverter circuit 20 applies the drive voltage to winding wire 33 as described above, a winding wire current flows through winding wire 33, thus winding wire 33 is energized.

Further, body-side microcomputer 70 includes body control function unit 71 and sequence instruction unit 73. Body control function unit 71 performs control by using the signals of various sensors 130 and the speed signal having been subjected to signal processing on motor 10 so that washing tub 90 can be arbitrarily operated. Sequence instruction unit 73 designates an operation mode of motor 10 so as to put washing tub 90 in an arbitrary operation mode.

Here, body-side microcomputer 70 plays a roll of controlling an operation of the whole washing machine. Specifically, body-side microcomputer 70 performs management based on an amount of laundry, a degree of dirtiness of laundry, and requirement of a person operating the washing machine so that motor 10 will accurately perform basic operations of washing, rinsing, and dewatering.

On the other hand, motor-side microcomputer 13 plays, as a controller, a roll of controlling an operation of motor 10 in accordance with the instruction from body-side microcomputer 70. Specifically, motor-side microcomputer 13 performs control of motor 10 with respect to respective basic operations so as to exert the maximum washing performance, to rinse so sufficiently that no soap component is left, and to sufficiently dewater for easy drying of laundry, and in addition, not to give damage to laundry and to save amount of electricity and water.

At this time, by using a data communication function, digital data such as program itself, a parameter, an operation sequence, and an operation mode is transmitted as information from body-side microcomputer 70 to motor-side microcomputer 13. Further, as the information from motor-side microcomputer 13 to body-side microcomputer 70, data is communicated which includes the current value and the rotation speed of motor 10, temperature information, load information, and a state of the washing tub. FIG. 1 shows an example in which data Dx is transmitted between motor-side microcomputer 13 and body-side microcomputer 70.

Figure 4:
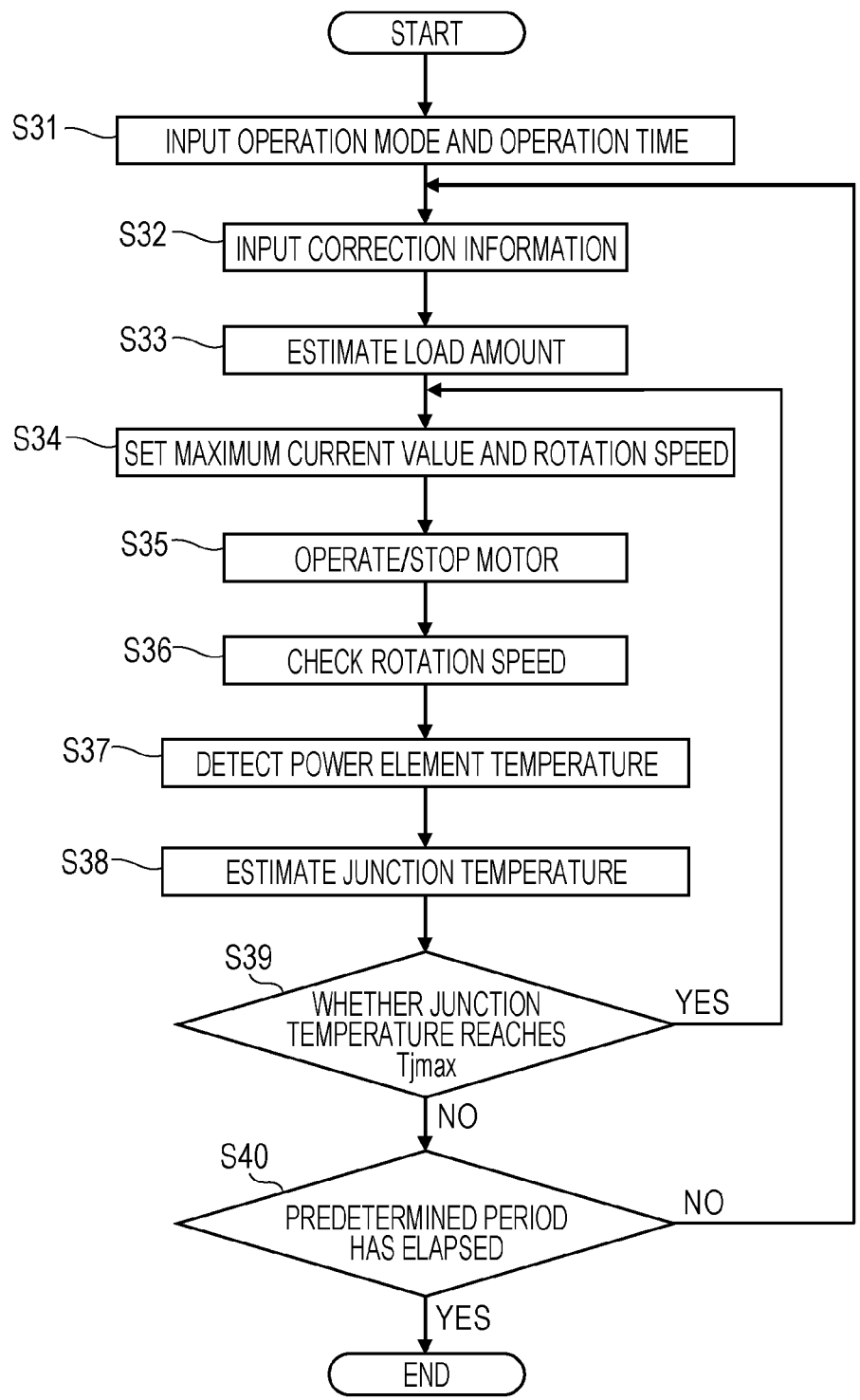
FIG. 4 is a flowchart at the time of a washing operation of the washing machine.

FIG. 4 is a flowchart, of washing machine 100 in the present exemplary embodiment, at the time of a washing operation. Next, a logic of the operation of motor 10 will be described with reference to the flowchart of FIG. 4. According to the operation mode selected by operation unit 112, a sequence instruction is input from body-side microcomputer 70 to motor-side microcomputer 13, where the sequence instruction includes an operation instruction for each of the modes such as washing, rinsing, and dewatering and a predetermined operation time for each mode (step S31).

Correction information such as stain removal from laundry is input from body-side microcomputer 70 to motor-side microcomputer 13 (step S32). After the sequence instruction is input, by comparing the current value of the current Ix of the power supply or the winding wire detected by current detecting element 22 with a previously prepared table, motor-side microcomputer 13 estimates the laundry as a load amount (step S33).

In order for the laundry to move appropriately in each operation mode, the torque and the rotation speed required for the time of start-up is derived from the estimated load amount and the previously prepared table, and motor-side microcomputer 13 set the maximum current value and a rotation speed (step S34). Then, motor-side microcomputer 13 outputs the PWM duty signal Dp to inverter circuit 20, and the drive voltage is thus applied to winding wire 33 of motor 50, then motor 10 is operated (step S35). Motor-side microcomputer 13 checks the rotation speed of motor 10 (step S36).

Further, the temperature of the power element (package temperature) incorporated in inverter circuit 20 is detected by temperature sensor 21 (step S37), and motor-side microcomputer 13 estimates a junction temperature based on the detected temperature (step S38). After that, motor-side microcomputer 13 determines whether the junction temperature will reach the maximum allowable junction temperature Tjmax (hereinafter, appropriately referred to simply as Tjmax) as a temperature of a predetermined value if the operation is continued without any change (step S39). At this time, if motor control microcomputer 13 determines that the junction temperature will exceed Tjmax, the process goes back to step S34 and adjust the current value so that the junction temperature will not exceed Tjmax. Note that, the temperature of the junction can be obtained by adding the temperature difference between the package and the junction to the temperature of the package of the power element. The temperature difference between the package and the junction is obtained as a product of a thermal resistance between the package and the junction and a loss at the junction.

In particular, in the present exemplary embodiment, because microcomputer type brushless motor 10 is used, the motor itself can make a determination about such a relationship between the power element temperature and the current limit value, from the obtained information. Therefore, regardless of whether a continuous operation is being performed or not, the current limit value can be adaptively set so that the junction temperature will not exceed Tjmax of the power element.

Specifically, in the present exemplary embodiment, by taking advantage of such an adaptive control being available, a process is performed in the motor at the time of start-up, in which process the current limit value is set equal to or greater than the above-described first current control value Ip1 (hereinafter, the process is referred to as a boost-up), and the torque of the motor is increased by this process at the time of start-up. As described above, in the present exemplary embodiment, a reference such as the protection operation temperature is not used as a threshold, but the present exemplary embodiment has an independent function in which, by estimating the rise in the junction temperature from the information of the temperature of the power element observed in real time, it is determined whether the junction temperature will reach Tjmax. Although a detailed description will be given in the following, in the present exemplary embodiment, by employing such a configuration, the rise in the temperature of the power element is controlled, and the washing time is shortened by taking advantage of the increased torque.

Finally, the time consumed up to this point of time is compared with a predetermined period required for each operation mode, and if the consumed time is equal to or less than the predetermined period, the process goes back to step S32, and motor-side microcomputer 13 repeats the same procedure until the predetermined period has elapsed (step S40).

Figure 5:
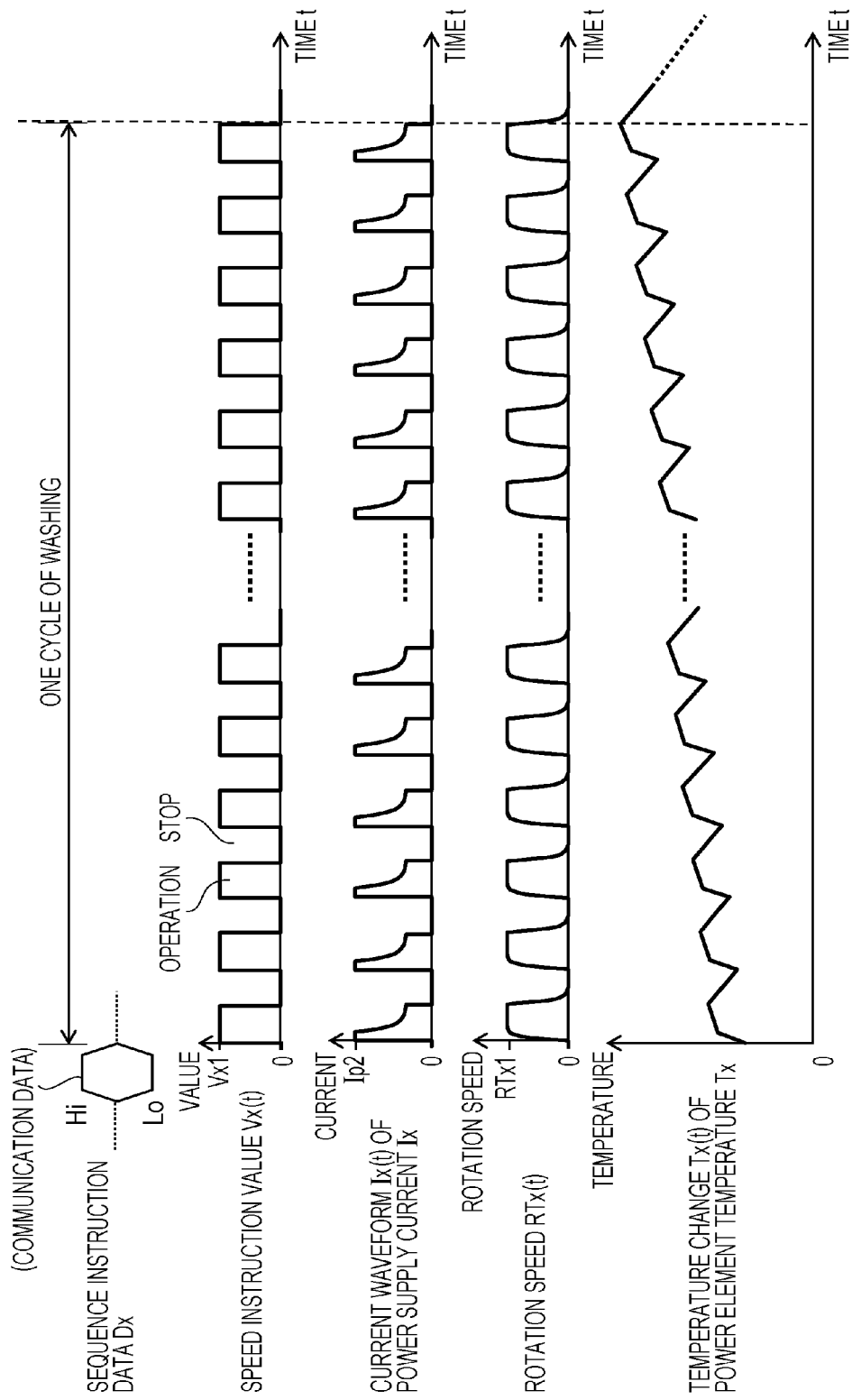
FIG. 5 is a diagram showing an operation example, in one cycle of washing, of the brushless motor according to the exemplary embodiment of the present invention.
Figure 6:
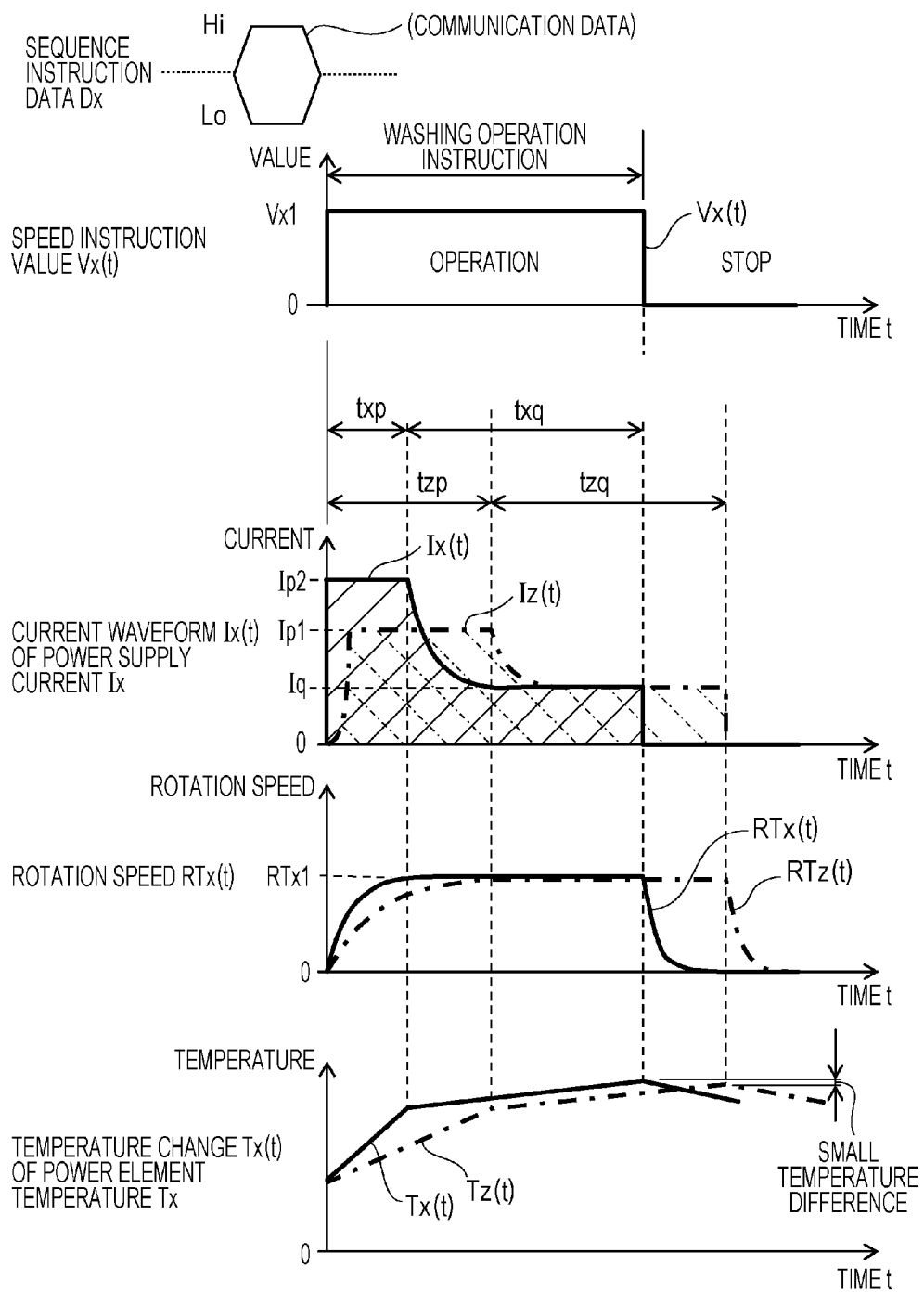
FIG. 6 is an enlarged view of a part, at the time of start-up, of the explanatory diagram of the washing operation of FIG. 5.

FIG. 5 is a diagram showing an operation example, for one cycle of washing, of brushless motor 10 according to the present exemplary embodiment, and shows the operation of motor 10 with time in one cycle of washing. Further, FIG. 6 is an enlarged view of a part, of FIG. 5, at the time of start-up of motor 10. In FIG. 5 and FIG. 6, the horizontal axes represent time t, and the graphs show, from top to bottom, sequence instruction data Dx, a speed instruction value Vx(t) indicated by the instruction data Dx, a current waveform Ix(t) of the power supply current Ix, a rotation speed RTx(t), and a temperature change Tx(t) of a power element temperature Tx. Further, in FIG. 6, the solid lines represent the current waveform Ix(t), the rotation speed RTx(t), and the temperature change Tx(t) of the present exemplary embodiment, and the dashed-dotted lines represent, for comparison, the current waveform Iz(t), the rotation speed RTz(t), and the temperature change Tz(t) of the conventional example described with reference to FIG. 11.

In order to operate washing tub 90 according to the operation mode selected by operation unit 112, the sequence instruction data Dx is input as a digital signal from sequence instruction unit 73 of body-side microcomputer 70 to motor control microcomputer 13. Because the sequence instruction data Dx is input, by communication, from body-side microcomputer 70, a rising/falling signal waveform associated with analogue voltage is not generated, and there is almost no issue about a time constant. That is, as shown in FIG. 5, the speed instruction value Vx(t) changes from 0 at the time of stopping to the value Vx1 representing a predetermined speed at the time of operating.

Note that the speed instruction value Vx(t) for repeating operation/stop is in motor-side microcomputer 13 incorporated in motor 10, as a digital value. A drive value is calculated by arithmetic processing, in motor-side microcomputer 13, using the speed instruction value Vx(t) or the like and is converted into a PWM duty signal Dp with a frequency of about 10 kHz to 20 kHz so as to pulse-drive inverter circuit 20, and a voltage corresponding to the drive value is applied to winding wire 33 of motor 50, thus the motor 10 is operated.

As a result, a trajectory of peak values of power supply current Ix supplied from power supply 80 and flowing through the power supply line has a waveform represented by the current waveform Ix(t) of the power supply current Ix. In particular, the present exemplary embodiment has a feature that the current waveform Ix(t), which is constituted by current peaks, is reaching a second current limit value Ip2 for a few milliseconds to a few hundred milliseconds at the time when the motor is started. That is, in the present exemplary embodiment, the second current limit value Ip2 greater than the first current limit value Ip1 is set to boost up. Because the rotation speed of the motor is relatively small during this time, a counter-electromotive force generated in the winding wire is small, and almost all of the applied voltage is applied to the winding wire, the current peaks reach the current limit value Ip2, and this state is generally referred to as an over-load state.

The rotation speed of the motor is rising toward a predetermined rotation speed as the rotation speed RTx(t) is rising. After the motor is started, the motor speed is gradually reaching the predetermined rotation speed RTx1, and the peaks of the power supply current Ix are also gradually reaching the current limit value Iq for a steady load state. Here, as described also in the background art, the first current limit value Ip1 in an over-load state (at the time of start-up) is generally the maximum value of the allowable current at the protection operation temperature which is determined such that the junction temperature of the power element will not exceed a predetermined value Tjmax on the premise that the brushless motor performs a continuous operation. Further, the current limit value Iq for a steady load state is the maximum value of the current which can generate enough amount of torque to rotate the motor at the predetermined rotation speed.

In contrast, the second current limit value Ip2 in an over-load state (at the time of start-up) set in the present exemplary embodiment is a value which can be arbitrarily set, not on the premise that the brushless motor performs a continuous operation, in a range with which the junction temperature of the power element does not exceed Tjmax. Specifically, in order to boost up, the second current limit value Ip2 can also be set to a value equal to or greater than the first current limit value Ip1 shown in FIG. 6. Thus, as shown in FIG. 6, the peaks of the current at the time of start-up change to the second current limit value Ip2 greater than the first current limit value Ip1. Then, the torque increased by this setting reduces the time taken to reach the predetermined rotation speed, the time required to start up (the time of an over-load state) is shortened from tzp to txp, compared with the case of the first current limit value Ip1.

As described above, in the present exemplary embodiment, compared with the rise of the rotation speed RTz(t) in the setting example of the conventional first current limit value Ip1, the rotation speed can rise more quickly as shown by the rotation speed RTx(t) of FIG. 6.

As described above, in the present exemplary embodiment, the second current limit value Ip2 greater than the first current limit value Ip1 is set so that motor 10 is operated with the second current limit value Ip2 only in a predetermined period after motor 10 is started. Further, because, according to the present exemplary embodiment, the rotation speed rises quickly and reaches a steady load point at which the rotation speed is the predetermined rotation speed, the current limit value Iq is set large enough to promptly generate an amount of torque expected for the steady load point.

In the operation state as described above, the relationship among the current limit values Ip1, Ip2, and the Iq set for the current waveform of the power supply current is expressed as Ip2>Ip1>Iq. Further, in the present exemplary embodiment, because motor-side microcomputer 13 determines in real time whether the junction temperature will reach Tjmax, it is possible to prevent the temperature protection operation from being performed while the current limit values are set to satisfy Ip2>Ip1.

Meanwhile, if the current limit values are simply set to satisfy Ip2>Ip1, the current, which is a major cause of the temperature rise of the power element, simply increases, and the temperature rise becomes large. On the other hand, because the rotation speed rises more quickly at the time of start-up, a washing cycle time can be reduced. That is, in the present exemplary embodiment, the quick rise of the rotation speed at the time of start-up improves the cleaning performance, and the operation time of one washing cycle is accordingly reduced. Thus, the increase amount of the current in the start-up time period txp and the decrease amount of the current in the time period txq in a steady load state cancel each other, and as a result, it is thus possible to control the rise in the temperature of the power element.

Figure 7:
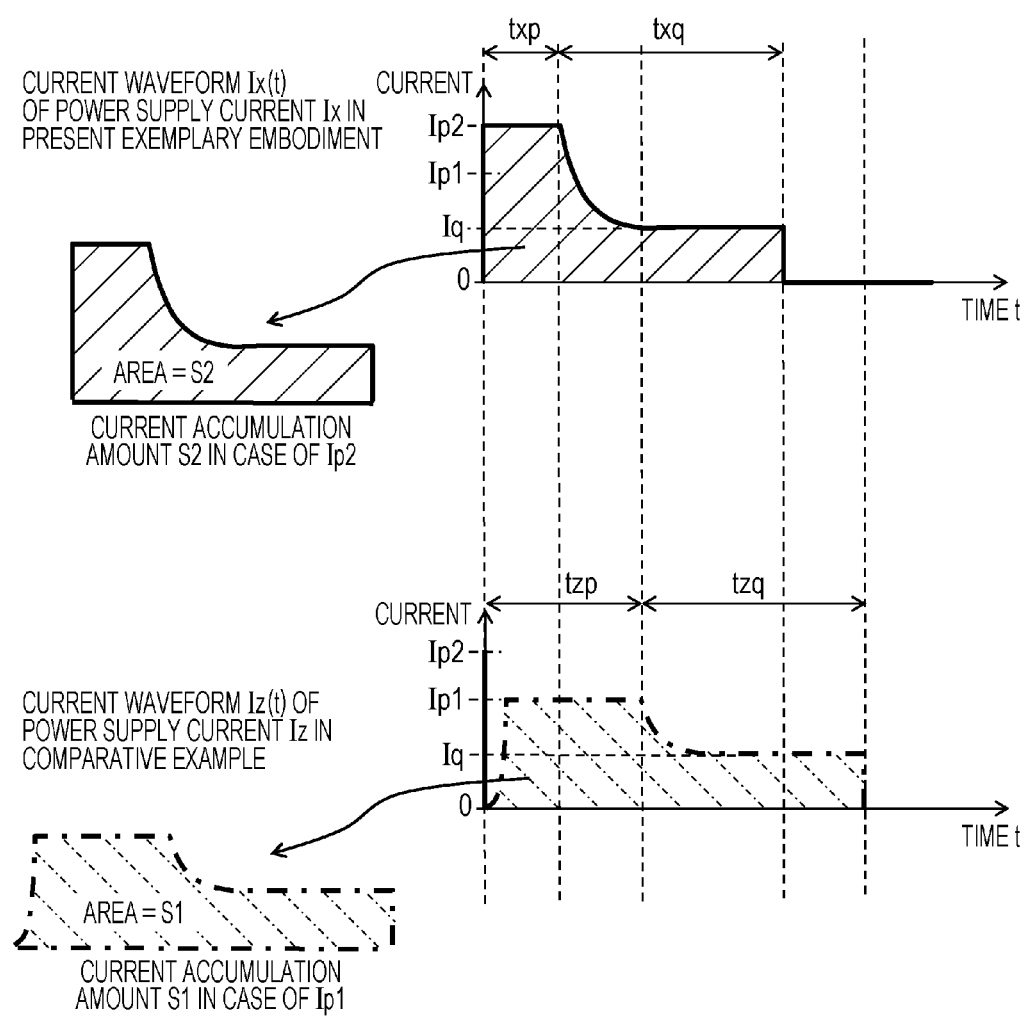
FIG. 7 is a diagram showing a current waveform Ix(t) of the brushless motor and a current waveform Iz(t) of a comparative example.
Figure 11:
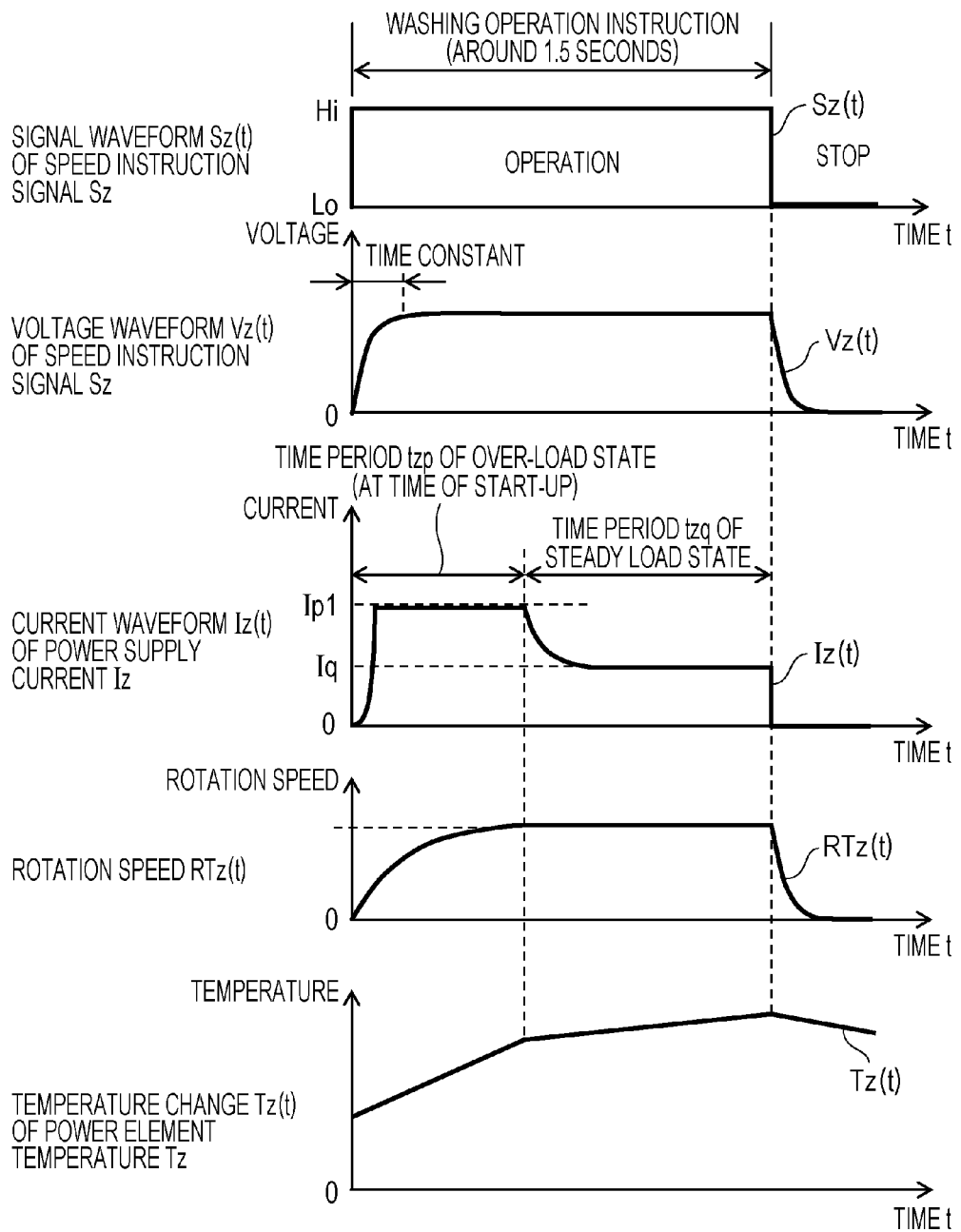
FIG. 11 is an enlarged view of a part, of FIG. 10, at the time of start-up.
Figure 12:
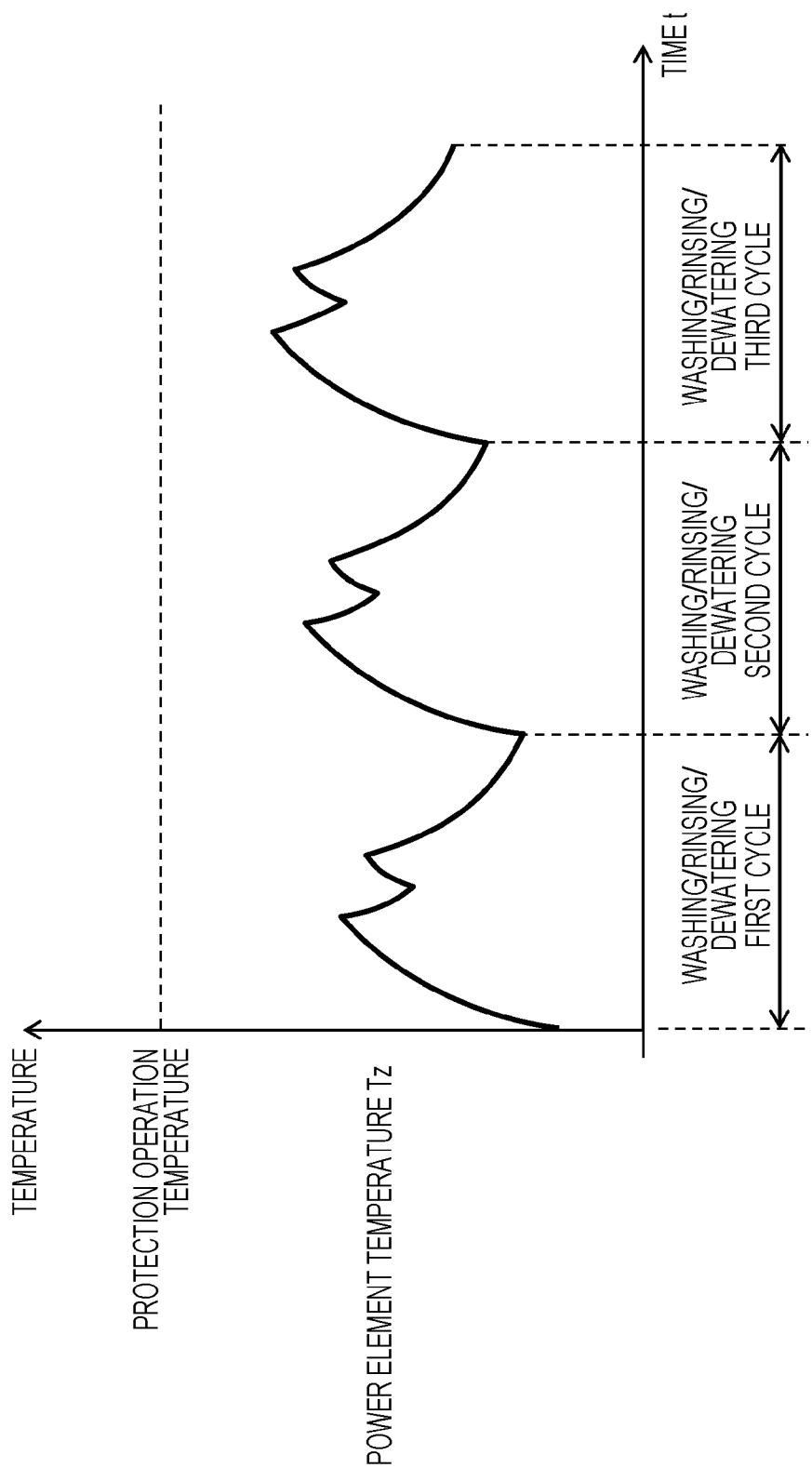
FIG. 12 is a diagram showing an example of a rising curve of the power element temperature Tz at the time of load operation of a conventional real machine.
Figure 13:
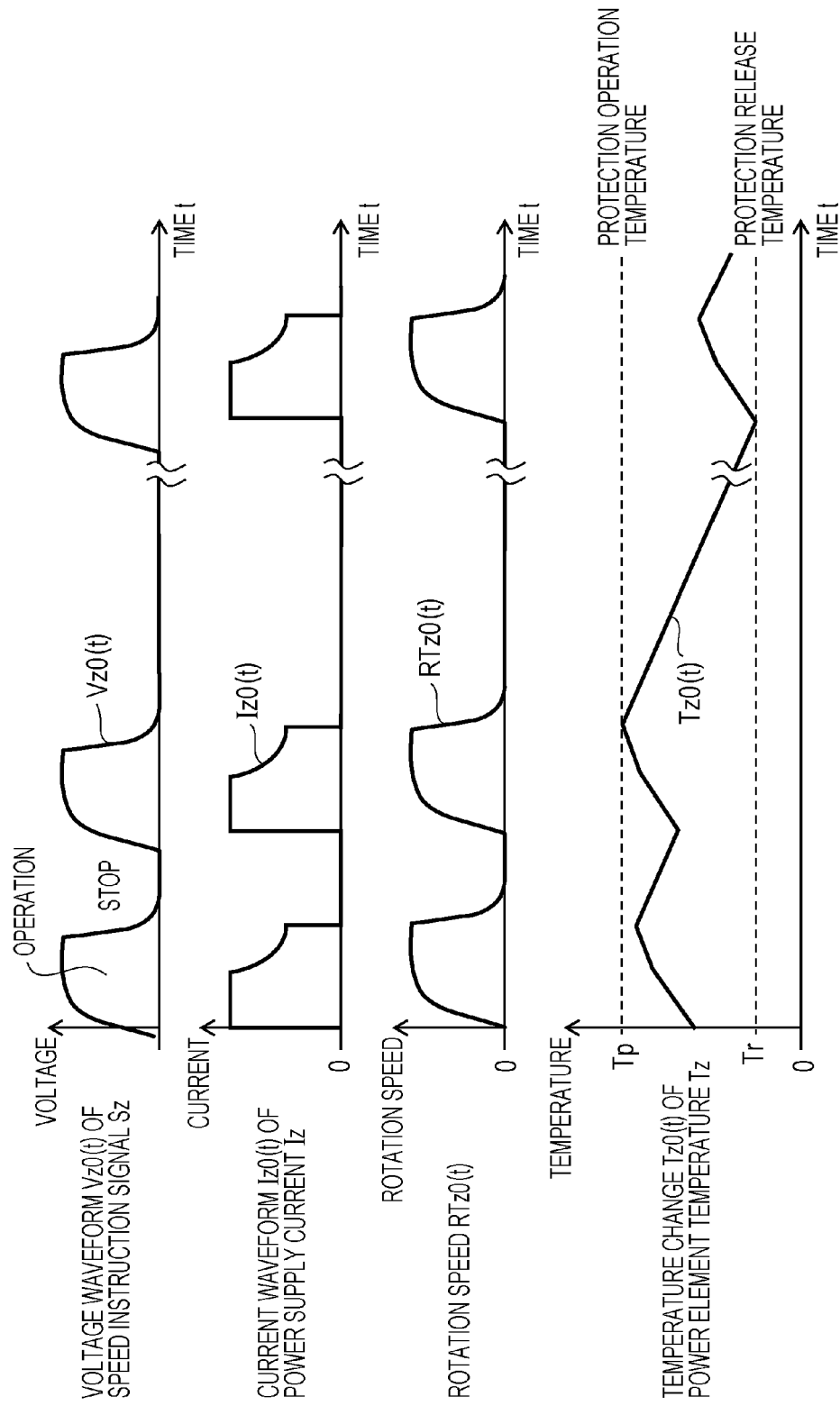
FIG. 13 is a diagram showing a specific example of a temperature protection operation of the power element of the conventional washing machine.
Figure 14:
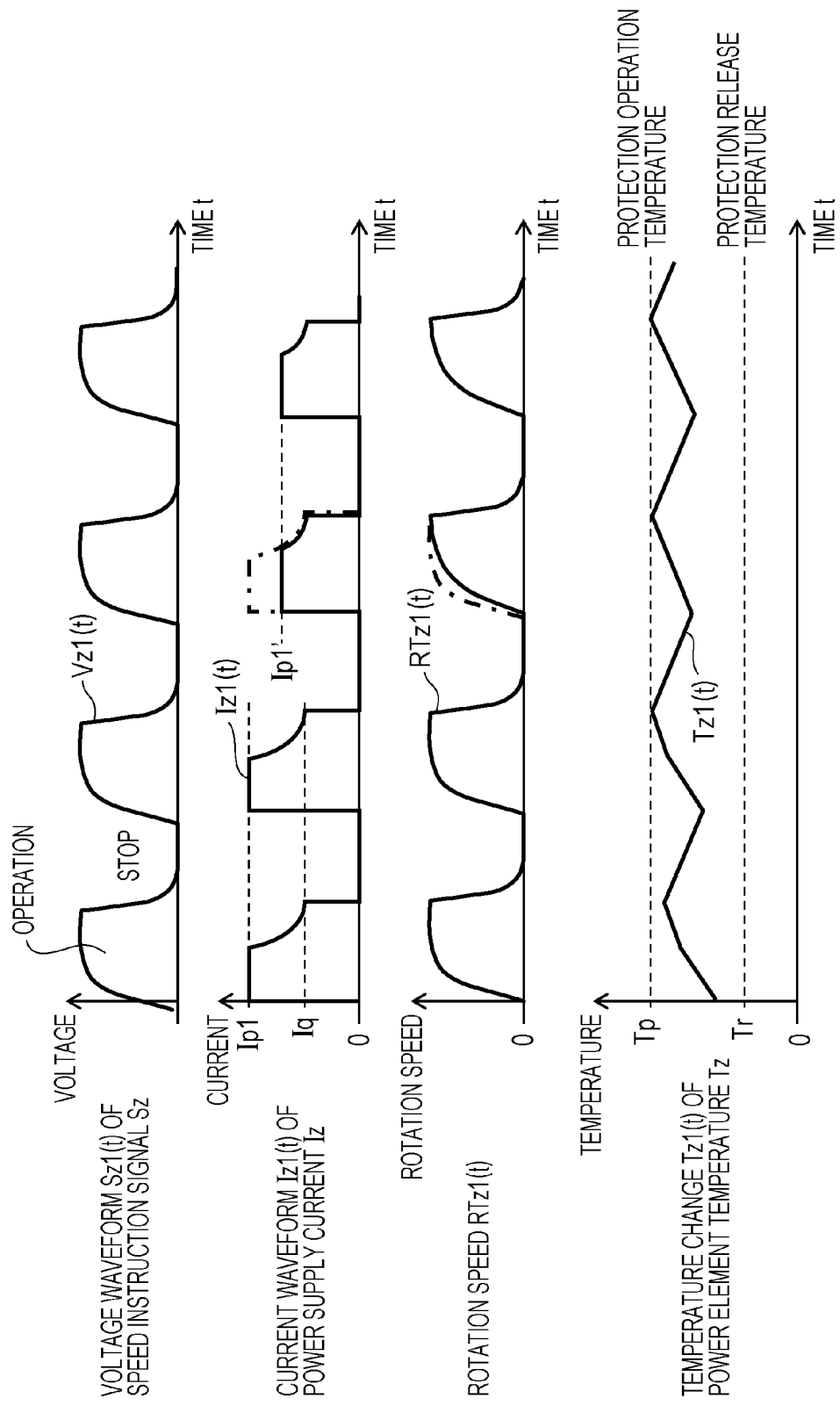
FIG. 14 is a diagram showing another specific example of the temperature protection operation of the power element.
Figure 15:
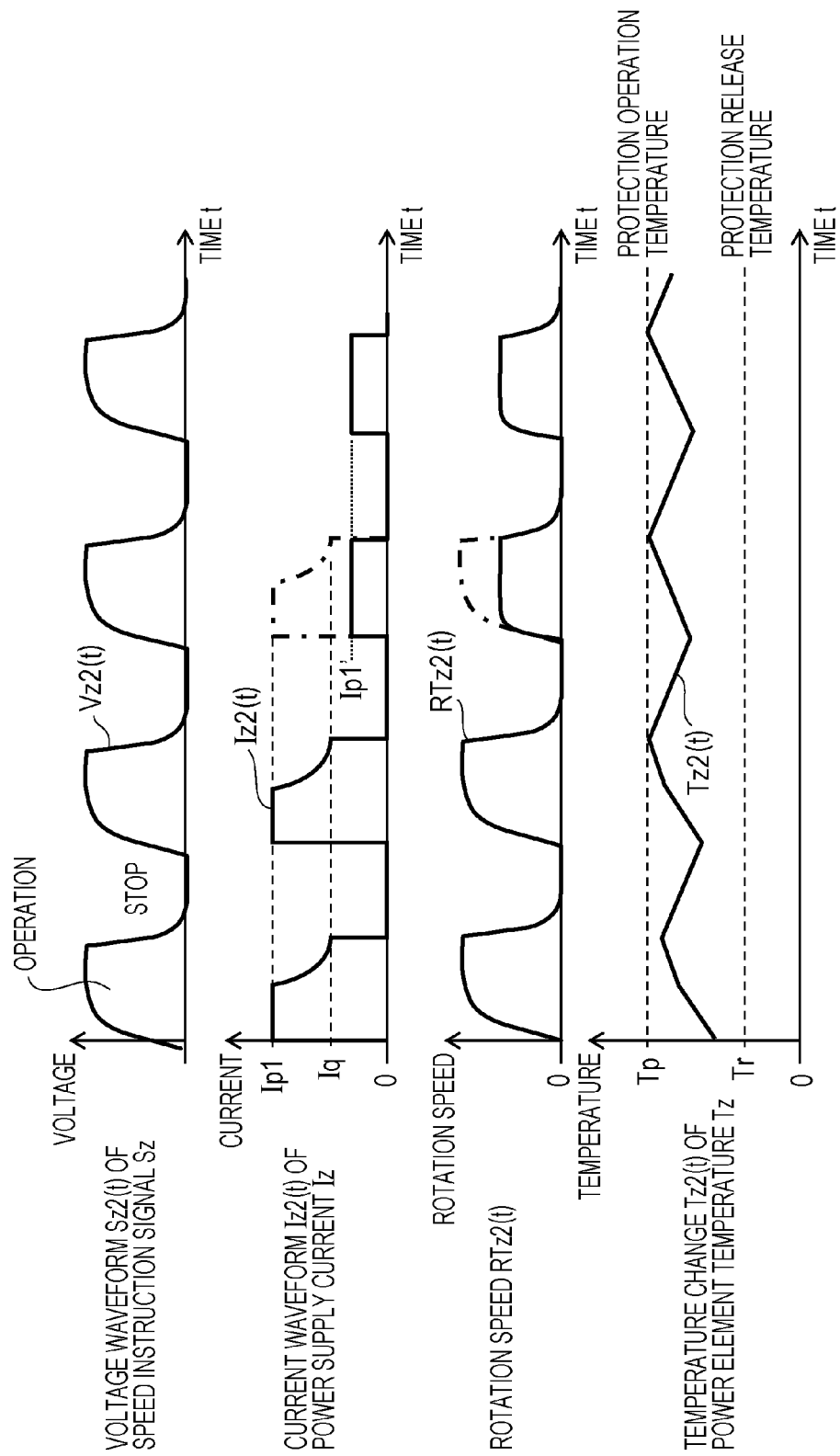
FIG. 15 is a diagram showing a still another specific example of the temperature protection operation of the power element.

FIG. 7 is a diagram showing, on the upper side, the current waveform Ix(t) of the power supply current Ix in the present exemplary embodiment and showing, on the lower side, the current waveform Iz(t) of the power supply current Iz in the conventional example described with reference to FIG. 11 as a comparative example. As shown in FIG. 7, in the case of the comparative example, the time period tzp of an over-load state at the time of start-up and the time period tzq of a steady load state account for the operation time. In contrast, in the present exemplary embodiment, because the rotation speed at the time of start-up rises at a high speed, the operation time can be reduced to the time period txp of an over-load state at the time of start-up and the time period txq of a steady load state, compared with the comparative example.

Specifically, as the comparative example (conventional example) shown in FIG. 7, in the case that the current limit value Ip1 is used, S1 is an accumulated amount (area) of the current value in the period of the time period tzp of an over-load state at the time of start-up and the time period tzq of a steady load state. Further, in the case that the current limit value Ip2 of the present exemplary embodiment shown in FIG. 7 is used, S2 is an accumulated amount (area) of the current value in the period of the time period txp of an over-load state at the time of start-up and the time period txq of a steady load state. Then, if the accumulated amount (area) S2 is reduced to the accumulated amount (area) S1 or smaller, the rise in the temperature of the power element is not changed, thus, it is possible to control the temperature rise similarly to before. As descried above, in the present exemplary embodiment, the current accumulation amount S2 is made equal to or smaller than the current accumulation amount S1, where S2 is a current accumulation amount based on an assumption that motor 10 is started with the second current limit value Ip2 and is then operated with the current limit value Iq for a steady load state, which is lower than the first current limit value Ip1, and where S1 is a current accumulation amount based on an assumption that motor 10 is started with the first current limit value Ip1 and is then operated with the current limit value Iq for a steady load state. In other words, in the present exemplary embodiment, motor 10 is started with such a second current limit value Ip2 that the current accumulation amount S2 is equal to or smaller than the current accumulation amount S1, which is a current accumulation amount based on an assumption that motor 10 is started with the first current limit value Ip1 and is operated.

Figure 8:
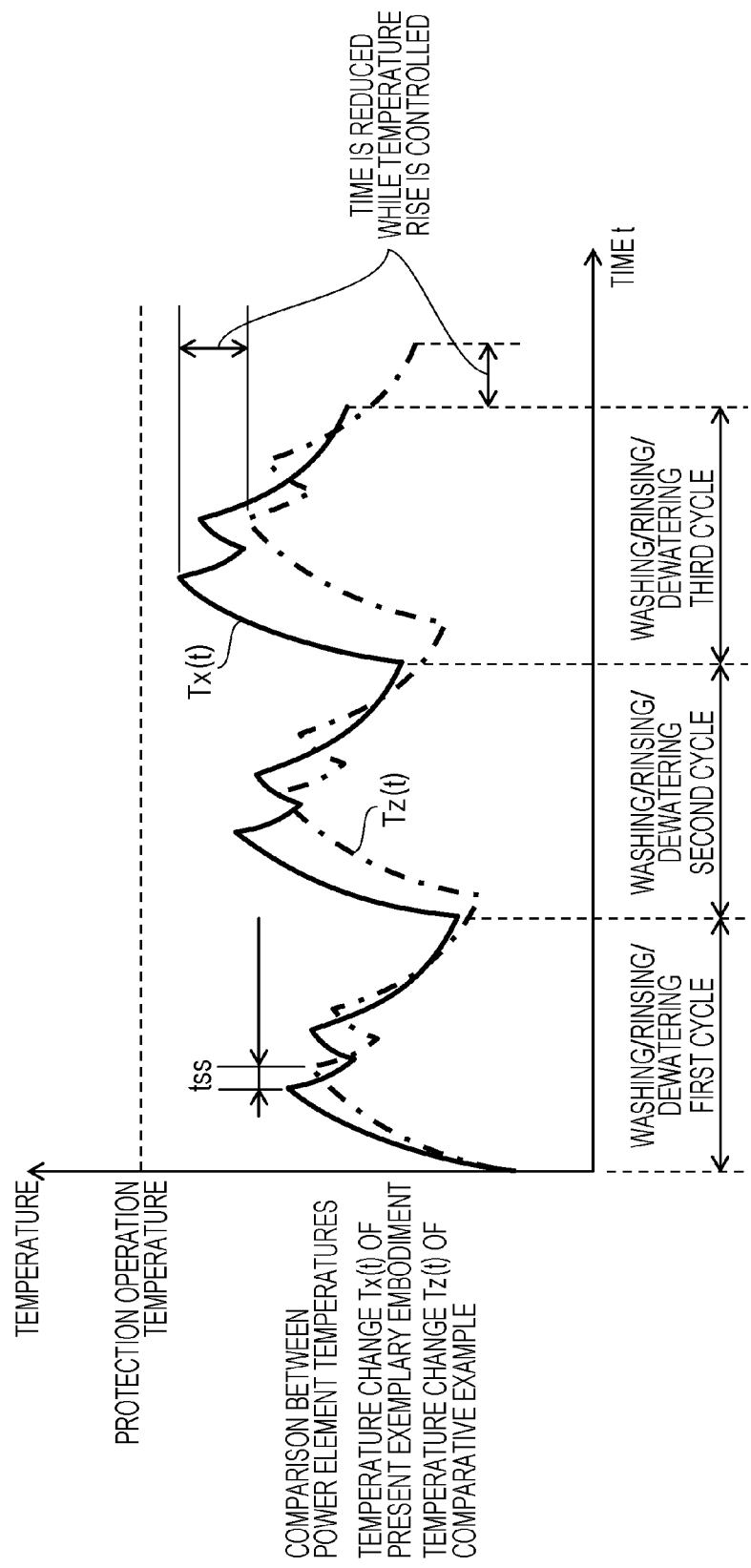
FIG. 8 is a diagram showing a rise in a temperature of a power element of the brushless motor.
Figure 9:
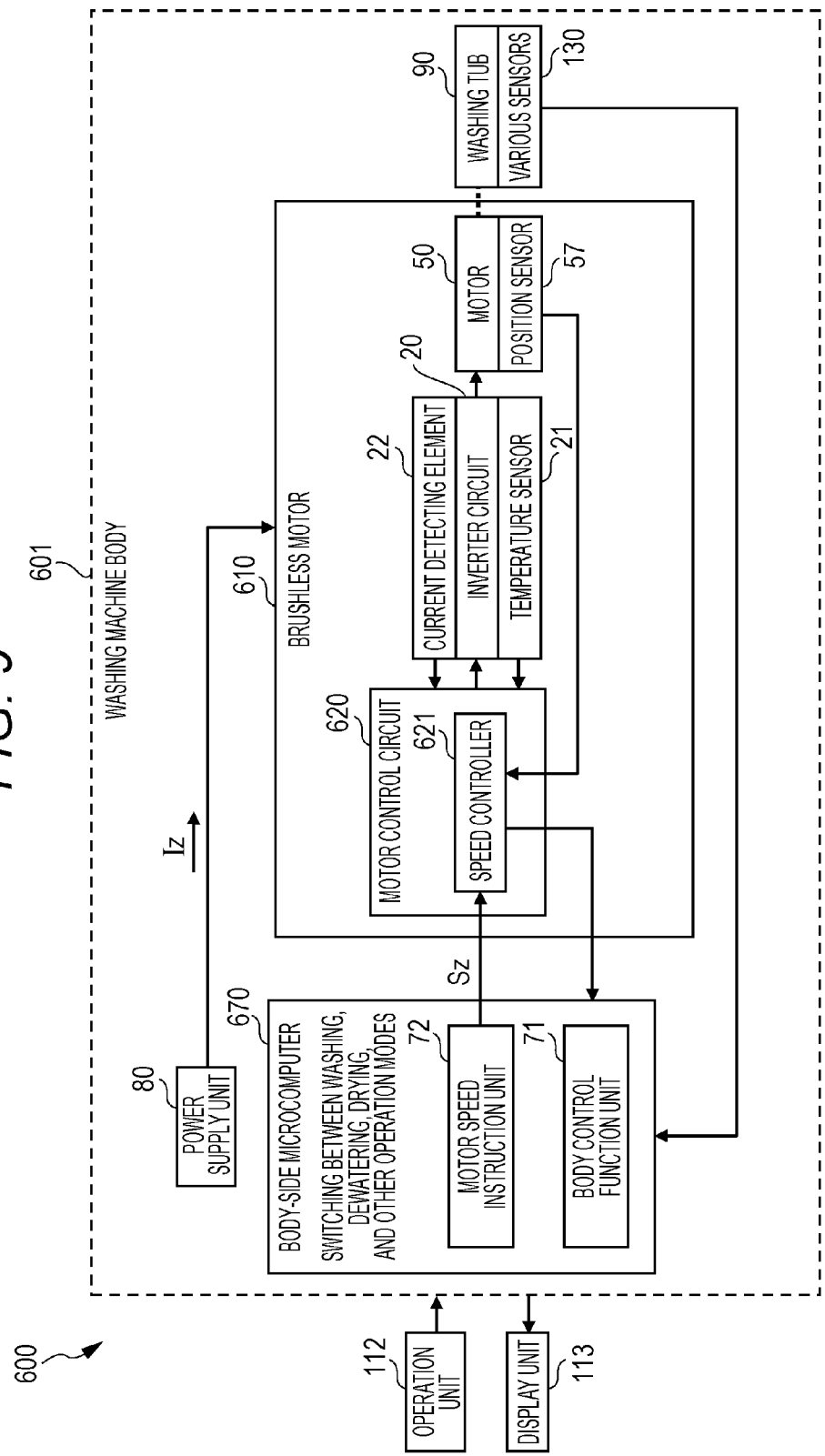
FIG. 9 is a block diagram of a conventional washing machine.
Figure 10:
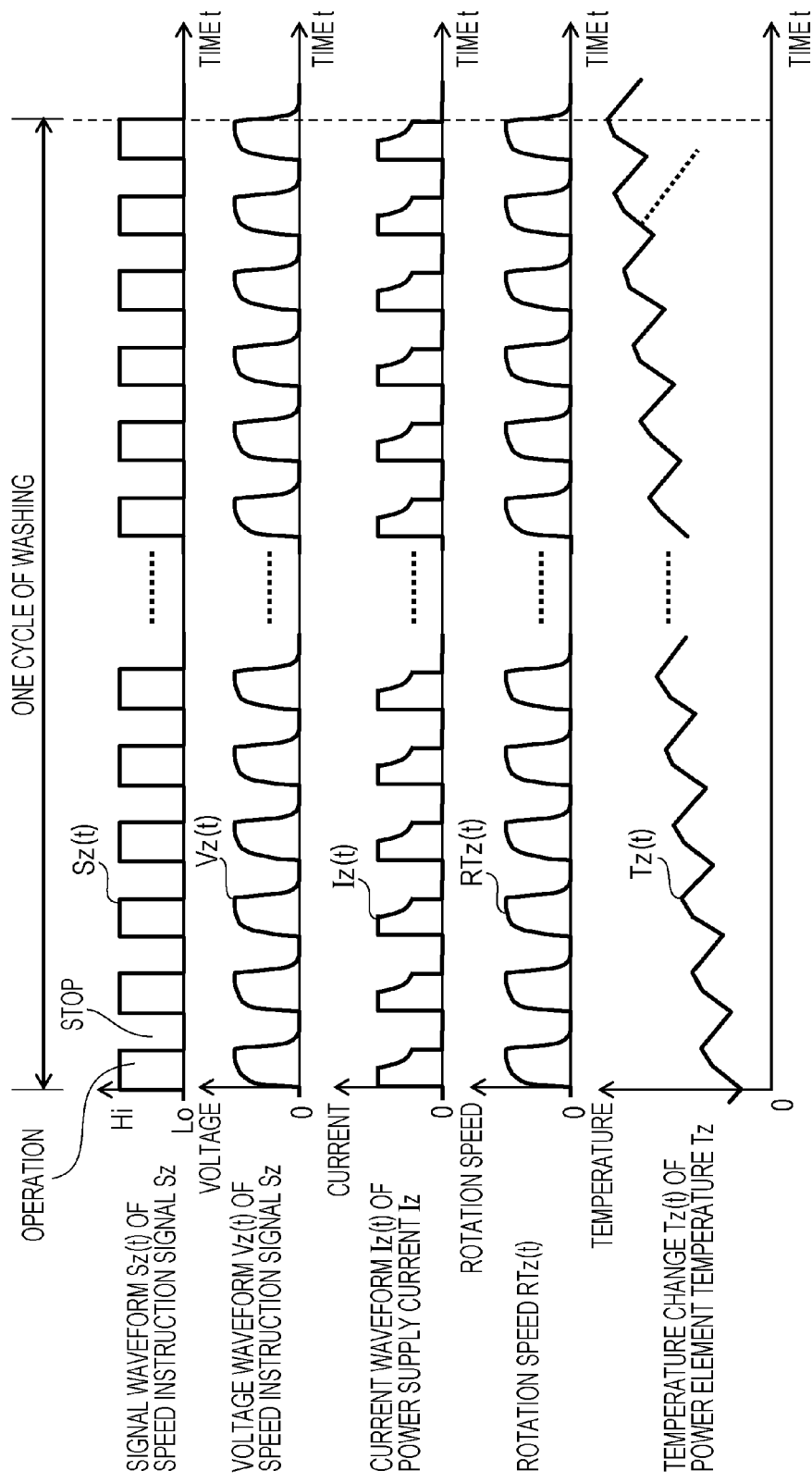
FIG. 10 is a diagram showing an operation example of the conventional brushless motor in one cycle of washing.

FIG. 8 is a diagram showing the temperature change Tx(t) of the power element of brushless motor 10 of the present exemplary embodiment at the time of load operation of a real machine. In FIG. 8, the solid line represents the temperature change Tx(t) of the present exemplary embodiment, and the dashed-dotted line represents the temperature change Tz(t) in the case of the comparative example shown in FIG. 7.

As shown in FIG. 6, by increasing, during a washing operation, the current limit value for the time of start-up to the second current limit value Ip2 in order to boost up, the temperature rise of the temperature change Tx(t) of the present exemplary embodiment becomes large as shown in FIG. 8, however, the time of a washing operation is reduced by a time period tss compared with the conventional the temperature change Tz(t). As described above, the time of one washing operation is shortened, and the washing time can be terminated accordingly sooner, and at the same time, the current limit value can be kept the same as before in the operation in which boost-up is not necessary such as rinsing or dewatering. Therefore, it is possible to control the temperature rise in one cycle of washing, rinsing, and dewatering, and it is possible to keep the rise in the temperature of the power element equal to or smaller than the conventional protection operation temperature after three cycles.

As one example of a motion of a washing tub effective to improve stain removal of laundry and to reduce a washing time, it is important to perform rise of a rotation speed at the time of start-up in a short time and to keep a rotation speed constant with no fluctuation after start-up. In the present exemplary embodiment, a motor itself realizes such an optimal current limit value and energization time for preventing destruction of a power element and for improving a required starting torque and a response of rise of the rotation speed, thus, it is possible to improve usability of the brushless motor compared with the conventional brushless motor.

INDUSTRIAL APPLICABILITY

As described above, according to the present invention, a motor itself realizes such an optimal current limit value and energization time for preventing destruction of a power element and for improving a required starting torque at the time of washing and a response of rise of a rotation speed, thus, it is best suited as a high functional brushless motor for a washing machine.

The invention claimed is:

1. A brushless motor for a washing machine, the brushless motor comprising:
   a motor, the motor including:
      a stator around which a winding wire is wound; and
      a rotor holding a permanent magnet;
   a motor control microcomputer;
   an inverter circuit in which a power element is incorporated and controls an amount of a voltage applied to the winding wire;
   a temperature detecting element which detects a temperature of the power element; and
   a current detecting element which detects a power supply current or a current of the winding wire,
   wherein a first current limit value is defined by a current limit value which is set such that a junction temperature of the power element does not exceed a predetermined value on a premise that the brushless motor performs a continuous operation,
   a second current limit value higher than the first current limit value is set, and
   the brushless motor operates, based on the second current limit value only in a predetermined period after start-up of the brushless motor.

2. The brushless motor according to claim 1, wherein a current accumulation amount is defined to be a sum of a time period of start-up of the brushless motor and a time period of a steady load state, and the current accumulation amount in a case that start-up is performed with the second current limit value and that operation is then performed with the current limit value for the steady load state lower than the first current limit value is made equal to or smaller than the current accumulation amount in a case that start-up is performed with the first current limit value and operation is then performed.

3. The brushless motor according to claim 2, wherein the motor control microcomputer can mutually communicate with a body-side microcomputer included in a body of the washing machine.

4. A washing machine comprising the brushless motor according to claim 3.

5. A washing machine comprising the brushless motor according to claim 2.

6. The brushless motor according to claim 1, wherein the motor control microcomputer can mutually communicate with a body-side microcomputer included in a body of the washing machine.

7. A washing machine comprising the brushless motor according to claim 6.

8. A washing machine comprising the brushless motor according to claim 1.

* * * * *